United States Patent [19]

Gressly et al.

[11] Patent Number: 4,935,938
[45] Date of Patent: Jun. 19, 1990

[54] SOLID STATE LASER

[75] Inventors: André Gressly; Andreas Bigler, both of Steffisburg, Switzerland

[73] Assignee: Lasag A.G., Switzerland

[21] Appl. No.: 271,255

[22] Filed: Nov. 15, 1988

[30] Foreign Application Priority Data

Nov. 17, 1987 [CH] Switzerland .................. 04471/87

[51] Int. Cl.⁵ .............................................. H01S 3/08
[52] U.S. Cl. ...................................... 382/98; 372/65; 372/92
[58] Field of Search .................... 372/69, 70, 96, 72, 372/34, 33, 92

[56] References Cited

U.S. PATENT DOCUMENTS

| 3,528,030 | 9/1970 | Bickel et al. | 372/72 |
| 4,232,276 | 11/1980 | Iwata | 372/72 |
| 4,313,092 | 1/1982 | Kaule | 372/70 |
| 4,379,203 | 4/1983 | Koszytorz | 372/35 |
| 4,507,789 | 3/1985 | Daly et al. | 372/35 |
| 4,566,107 | 1/1986 | Kitaura et al. | 372/72 |
| 4,751,716 | 6/1988 | Ream | 372/72 |

FOREIGN PATENT DOCUMENTS 1951267 6/1970 Fed. Rep. of Germany.
1614624 9/1970 Fed. Rep. of Germany.

Primary Examiner—Léon Scott, Jr.
Attorney, Agent, or Firm—Pollock, Vande Sande & Priddy

[57] ABSTRACT

A laser (1) has its laser head (3) connected to its base (2) by hinges having a common axis (R) parallel to the laser beam axis (4a). When the lamp for energizing the laser rod must be replaced, the head (3) can be pivoted about the axis (R) to a position in which the lamp can easily be removed from its cavity and a new lamp fitted therein, the removal and fitting being accomplished by moving the lamps along their axis (5a).

9 Claims, 3 Drawing Sheets

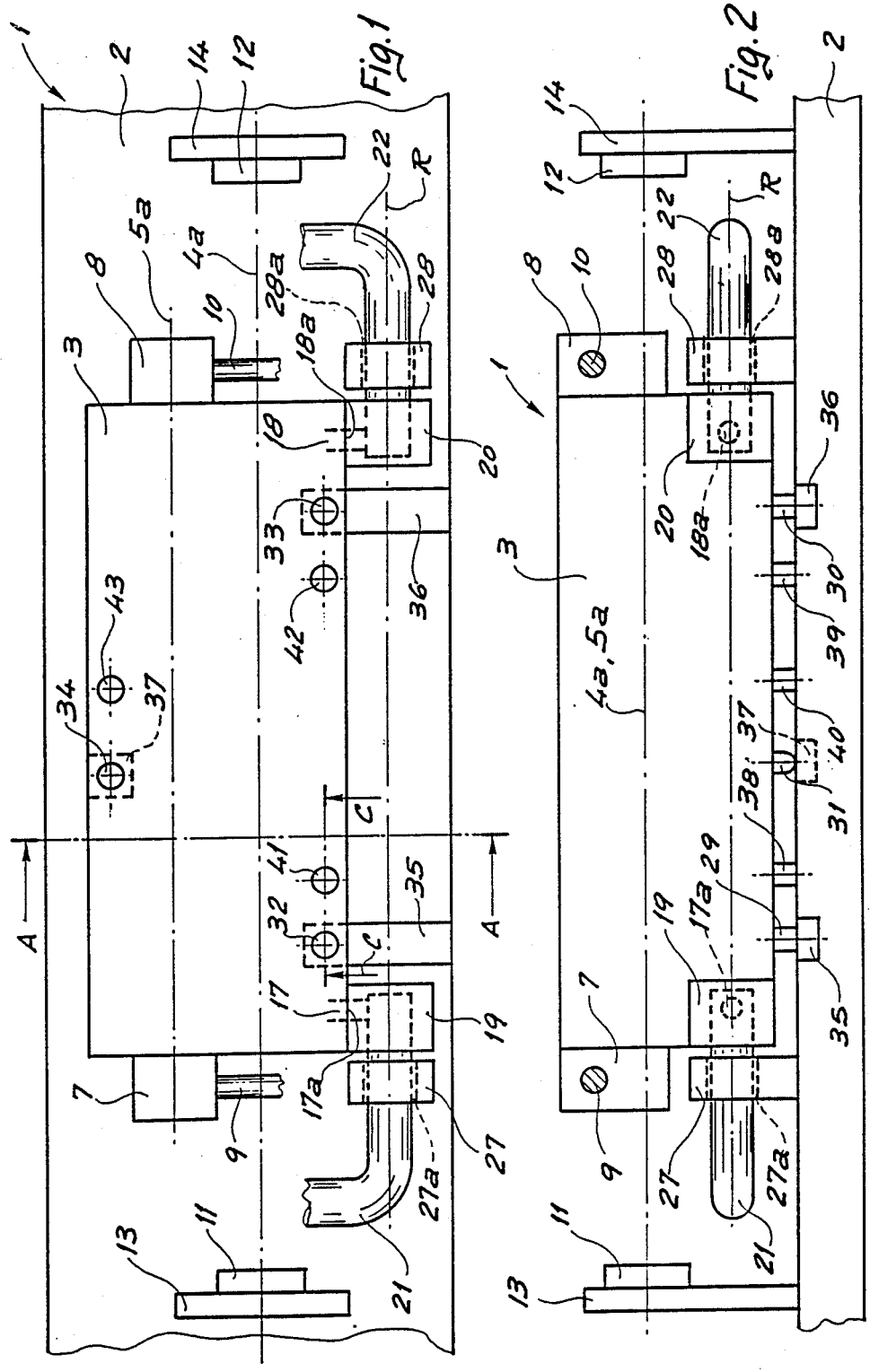

SOLID STATE LASER

BACKGROUND OF INVENTION

The present invention concerns a solid state laser comprising a rigid base, a laser head including a laser rod having a longitudinal axis and an optical pumping lamp coupled to said laser rod, and means for connecting said laser head to said base.

As will be evident from the following description, the laser according to the present invention may be either an oscillating laser or an amplifying laser.

The first type as is well known includes two mirrors, at least one of which is partially transparent, arranged along and on either side of the laser rod's axis to define a resonance cavity.

The second type does not have such mirrors.

In such lasers, the pumping lamp of the laser rod must be replaced quite frequently because it wears rapidly and sometimes even breaks.

This lamp has an elongated shape and is arranged in the laser head with its longitudinal axis parallel to that of the laser rod.

Moreover, this lamp is fixed in the laser head by its two ends which pass through suitable openings provided in the walls of the laser head.

To replace this lamp, it must thus be slid through one of these openings in a direction parallel to the axis of the laser rod.

In a laser, however, the optical elements such as the aforementioned mirrors or lenses are usually arranged along the axis of the laser rod spaced apart from the laser rod by distances which are less than the length of the pumping lamp, and these optical elements or their supports often obstruct complete removal of the pumping lamp from the laser head.

Mostly therefore to be able to replace the pumping lamp, the laser head or one or more of these optical elements must be completely removed from the base on which they are secured.

Such dismantling has the drawback that all adjustments of the position of the various components of the laser required for its correct operation must be made once again after each replacement of the pumping lamp. These adjustments are delicate and require much time.

Moreover, the laser head usually has a duct in which a cooling fluid such as water flows to remove heat produced during operation of the laser, and a portion of this duct surrounds the pumping lamp.

If the laser head is dismantled to allow replacement of the pumping lamp, this piping must of course be disconnected before the dismantling operation and must be reconnected after the laser head has been replaced.

During these operations of disconnecting and reconnecting the piping, it is possible that some cooling fluid may flow onto the laser base or other elements of the laser and this may lead to corrosion of the base and/or elements. It is also possible that this fluid produces short-circuits between elements located on this base and which are at different potentials during operation of the laser.

Moreover, in any event, some fluid may also escape from the laser head when the lamp is slid out of its cavity, with the same consequences as above.

It is sometimes possible to configure one of the supports for the optical elements arranged along the axis of the laser rod such that it does not obstruct replacement of the pumping lamp, for example by providing in this support an opening of suitable size and location.

There is therefore no need then to make the aforementioned adjustments each time the lamp is changed, but cooling fluid is still liable to flow onto the laser base.

Furthermore, if the pumping lamp has to be replaced not because it is worn but because it is broken, it is in any event necessary to separate the laser head from the laser base, with the drawbacks set out above, because otherwise it would not be possible to adequately clean the lamp's socket and remove all of the debris therefrom.

In currently-available lasers of the above-defined type, the laser head is directly fixed to the base.

A part of the heat produced during operation of the laser is consequently transmitted to this base, even if the laser head is cooled in the above-described manner.

This results in local heating and deformation of the laser base. As the other components of the laser and in particular the optical parts are also fixed to the base, this deformation leads to a variation in the position of these parts relative to one another and to the laser head.

This variation may disturb operation of the laser or may even cause it to break down.

An object of the present invention is to propose a laser of the above defined type which does not have the described drawbacks, i.e. in which replacement of the pumping lamp is easy, requires no readjustment of the various components of the laser and may, in relevant cases, be carried out without any cooling fluid dripping on the base or on any other part of the laser.

This object is achieved due to the fact that, in the claimed laser, the means for connecting the laser head to the laser base comprise a hinge enabling this head to be pivoted relative to the base about an axis of rotation substantially parallel to the axis of the laser rod.

BRIEF DESCRIPTION OF THE DRAWINGS

Further objects, features and advantages of the laser according to the invention will be apparent from the following description of an embodiment thereof illustrated by way of non-limiting example in the accompanying drawings, in which:

FIG. 1 is a diagrammatic plan view of a first embodiment of a laser according to the invention;

FIG. 2 is a diagrammatic side view of the laser of FIG. 1;

DETAILED DESCRIPTION

Figure 3:
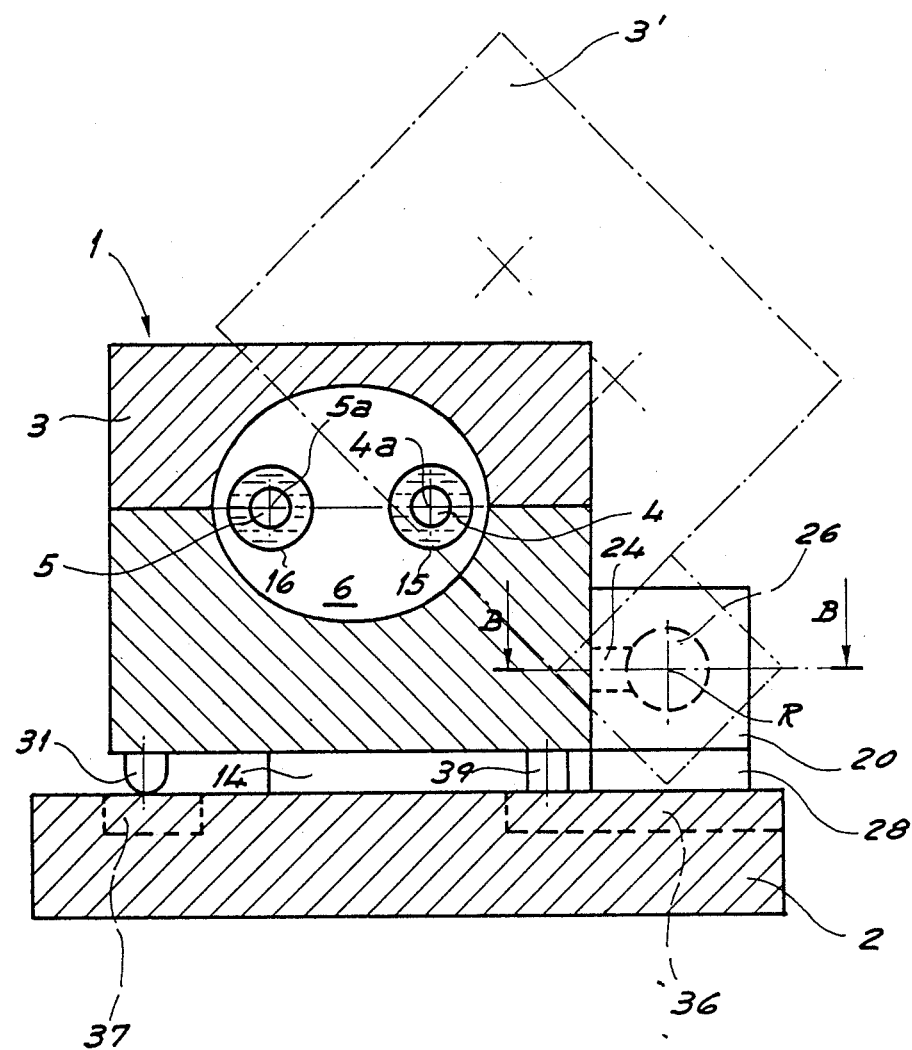
FIG. 3 is diagrammatic partial cross-section of the laser of FIG. 1 along line A—A of the latter.

In the embodiment shown by way of non-limiting example in FIGS. 1 to 3 the laser according to the invention is designated by reference 1.

It comprises a rigid elongate base 2 which serves as support for all of its components, notably a laser head 3 containing a laser rod 4, for example a rod of neodymium doped yttrium aluminum garnet, and the associated optical pumping lamp 5.

The rod 4 and lamp 5, which are not visible in FIGS. 1 and 2, are elongated and their longitudinal axes are designated respectively by references 4a and 5a.

The rod 4 and lamp 5 are arranged in a cavity in the laser head 3 with their axes 4a and 5a parallel to one another and at least substantially parallel to the length direction of base 2.

The cavity 6, which is not visible in FIGS. 1 and 2, is arranged in such a manner that the lamp 5 is optically coupled to the rod 4 and virtually all of the light it emits reaches the rod 4.

As can be seen in FIG. 3, the cavity 6 has the shape of a right-angled cylinder of elliptical cross-section, the focal axes of which respectively coinciding with the axis 4a of the rod and the axis 5a of the lamp.

The cavity 6 has an internal wall 6a which is necessarily of regular shape and reflective over its entire surface; it is consequently not permissible to provide therein an opening for the removal and replacement of the pumping lamp 5 by moving it in a direction perpendicular to its axis 5a.

It is therefore necessary to provide at each end of the cavity 6 an opening leading out into one of the side faces of the laser head 3 and through which the lamp 5 can be slid along the direction of its axis 5a. These openings are not visible in FIGS. 1 to 3, and will not be further described in detail.

When the lamp 5 is in place, its two ends are situated each in one of the openings. Also, these ends each carry a connection terminal connected to an electric supply, not shown, via a connector and a cable.

These connectors, designated by respective references 7 and 8, as well as the electrical and mechanical connection thereof with the connection terminals of the lamp and with the cables, designated respectively by 9 and 10, will also not be described in detail.

The above-mentioned openings are of course normally closed in fluid-tight manner, for example by means of sealing elements which are also not shown.

In the illustrated example, the laser 1 is an oscillator laser comprising two mirrors 11 and 12 arranged on the axis 4a of the laser beam and fixed to the base 2 by supports 13, 14 respectively.

In known manner, one of the mirrors 11, 12 is partially transparent to the beam produced by laser 1 and the other partially or completely reflects this beam, and these mirrors define the resonance cavity of laser 1.

In FIGS. 1 and 2, the mirrors 11, 12 are planar but it is well known that, from case to case, either one or both could be concave or convex.

Details of the manner of securing the mirrors 11 and 12 on supports 13 and 14 and of these supports to base 2 will not be described in detail as they do not relate directly to the invention.

The laser 1 also includes means for removing as much as possible of the heat produced in the head 3 during operation.

These means comprise in particular transparent cylindrical tubes 15 and 16 which are concentric to the rod 4 and lamp 5 respectively (FIG. 3).

These tubes 15 and 16 are connected to a duct in the laser head 3, and of which only the ends 17 and 18 are visible. These ends lead into the front face of the laser head 3 where they form orifices 17a, 18a respectively, and their axes are situated at the same distance from the lower surface of laser head 3.

Laser 1 also includes connectors 19, 20 adapted to connect the ends 17, 18 of the above-mentioned duct to metal pipes 21, 22 external of the laser head 3.

One of these pipes 21, 22 is arranged to supply a cooling fluid, for example water, from a source (not shown) to the laser head 3, and the other pipe is arranged to remove this fluid after it has passed through the head 3 and deliver it to a drain or a suitable cooling device (not shown) from where it is returned to the source.

Each of the pipes 21, 22 is fixed to the base 2 some distance away from its end whereby this end is able slightly to move in all directions, in conditions which will be explained later. If required, the elasticity of these pipes may play a part in allowing their ends to move in this way.

The connectors 19, 20 each comprise a first blind hole 23, 24 respectively and they are fixed to the laser head 3, by means not shown, in such a manner that the holes 23, 24 are coaxial with the respective ends 17, 18 of the above-mentioned duct. An O-ring is arranged around each of the orifices 17a, 18a in a suitable groove between the laser head 3 and the respective connectors 19, 20.

The connectors 19, 20 also each have a second blind hole 25, 26 respectively, whose axis is perpendicular to the axis of hole 23 or 24 and parallel to the axis 4a of the laser rod.

The axes of these holes 25, 26 thus coincide and form a single axis, designated by R, parallel to the axis 4a of the laser beam.

The ends of the above-mentioned pipes 21, 22 are cylindrical with their diameters slightly smaller than the diameters of holes 25, 26. These ends of pipes 21, 22 engage in the respective holes 25, 26 with O-rings located around these pipes in suitable grooves.

Furthermore, two supporting pieces 27, 28 are fixed to the base 2 of laser 1 in a manner which has not been illustated, on either side of the laser head 3 adjacent to the connectors 19, 20.

These supporting pieces each have a cylindrical hole 27a, 28a respectively through which the respective pipe 21, 22 passes. The diameter of holes 27a, 28a is greater than the diameter of pipes 21, 22 so that the latter can move radially in these holes in the conditions to be described below.

The ends of pipes 21, 22 each form the first element of a type of hinge whose second element is formed by the corresponding connector 19 or 20. These hinges have the same axis R which is situated some distance away from and parallel to the base 2, whereby it is possible to pivot the laser head 3 about this axis R as long as the means for securing the laser head 3 to the base 2, which will be described below, do not prevent this pivoting.

For example, FIG. 3 shows in a chain line and with reference 3' the laser head 3 in a position after pivoting by about 45°.

The provision of hinges formed by the connectors 19, 20 and pipes 21, 22 thus allows the lamp 5 to be replaced easily, when necessary, by pivoting the laser head 3 into a position in which no other components of the laser 1 obstruct this lamp from being slid out of its housing.

It is even easy, by suitably dimensioning the various above-described elements, to allow the laser head 3 to pivot up to a position in which the vertical plane passing through the axis 5a of lamp 5 no longer intersects the base 2.

When the head 3 is located in such a position, any cooling fluid that may possibly leak when the lamp 5 is removed from its housing will drop outside the base 2 and not on it or on any of the components of laser 1 secured thereto.

It is thus possible to replace the lamp 5 without danger of corroding the base 2 and/or causing a short-circuit between the components of laser 1.

Furthermore, when the lamp 5 is broken, it is easy to clean its housing using a brush, for example. In such a case, there is no danger of the debris of lamp 5 falling on the base 2 and/or on the other components of laser 1.

It should be noted that, when the laser head 3 is pivoted as described above, the supporting pieces 27, 28 retain the ends of pipes 21, 22 and prevent them from being twisted under the weight of head 3.

In the illustrated embodiment, the laser 1 also comprises means for adjusting the position and the orientation of laser head 3 in relation to the base 2 and hence of the beam emitted during operation of laser 1.

These adjustment means comprise three screws 29, 30 and 31 engaged in threaded holes 32, 33 and 34 extending all the way through the laser head 3 perpendicularly to the plane of base 2. The holes 32, 33 are each arranged at one end of the laser head 3 adjacent its front face, and hole 34 is located substantially half way along the length of head 3, adjacent its rear face, so that the axes of holes 32 to 34 are in triangular configuration when laser 1 is viewed in plan.

Screws 29, 30 cooperate respectively with a plate 35 and a plate 36 slidably mounted in grooves in the base 2 perpendicular to the length direction of base 2.

The means for enabling the plates 35, 36 to be moved in these grooves and locked in a selected position have not been shown as these are well known to persons skilled in the art.

Figures 5, 6A, 6B:
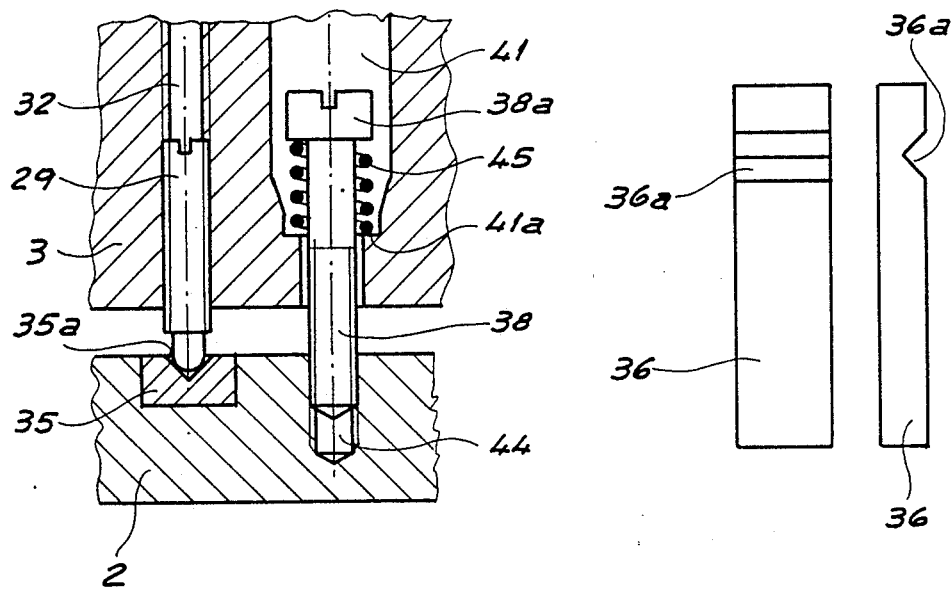
FIG. 5 is a diagrammatic cross-section of a part of the laser of FIG. 1 along line C—C thereof.
FIGS. 6a and 6b are respectively a plan view and a side view of a component of the laser of FIG. 1.

The plate 35 has a conical recess 35a in which the spherical end of screw 29 engages (FIG. 5).

The plate 36 has a groove 36a of triangular cross-section extending lengthwise in a direction parallel to the axis 4a of the laser rod (FIGS. 6a and 6b) and in which the spherical end of screw 30 engages.

The screw 31 also has a spherical end bearing on a planar region of the base 2 constituted in this example by the upper face of a planar plate 37 fixed to base 2. The plate 37 is indicated in a dashed line in FIGS. 1 to 3.

It can be seen that it is easy to adjust the position and the orientation of the laser beam axis 4a as long as the hereinafter-described means for securing the laser head 3 on base 2 are not operatively engaged.

The position and the orientation of axis 4a can be adjusted in a plane perpendicular to the plane of the base 2 by acting on screws 29 to 31, whereas the position and orientation of axis 4a can be ajusted in a plane parallel to the plane of base 2 by moving the plates 35 and 36.

All of these adjustments can, at least to a certain degree, be done freely due to the fact that the diameters of the openings 27a, 28a provided in the supporting pieces 27, 28 are larger than the diameters of pipes 21, 22 and due to the fact that the pipes 21, 22 are fixed to the base 2 at a location spaced by some distance away from their ends, in the manner indicated above.

Moreover, there is no need to make these adjustments again after the laser head 3 has been pivoted about axis R to allow the lamp 5 to be changed or for any other purpose, because the positions of the adjusting screws 29 to 31 relative to the laser head 3 and of the plates 35, 36 relative to the base 2 are not altered during this pivoting movement.

When the head 3 is put back in place, the flexibility of pipes 21, 22 allows the ends of screws 29, 30 to reengage respectively in the conical hole 35a and in groove 36a, and the screw 31 to come back into abutment against the plate 37. The laser head 3 thus reassumes exactly the same position it occupied before it was pivoted about the axis R.

It is also important to note that whatever may be the degree of thermal expansion of the laser head 3 due to heating during operation of laser 1, the screw 29 remains fixed in relation to the base 2 because its end is engaged in the conical hole 35a of plate 35. But the screws 30, 31 can move in response to this thermal expansion, the former sliding in groove 36a of plate 36 and the latter sliding on plate 37. As the groove 36a is practically parallel to the direction of the laser beam axis 4a, such thermal expansion of laser head 3 has no significant influence on the position and orientation of axis 4a.

Additionally, this expansion produces no other distortion of the laser head 3, nor mechanical stresses therein and/or in base 2.

In the illustrated embodiment, laser 1 further includes means for securing the laser head 3 on base 2 comprising three screws 38, 39 and 40 arranged in holes 41, 42 and 43 which extend through laser head 3 in a direction perpendicular to the plane of base 2 and are each located adjacent one of the threaded holes 32 to 34.

The ends of screws 38 to 40 engage in threaded holes provided in base 2. Only the threaded hole in which screw 38 engages is visible in FIG. 5 and designated by reference 44.

It can also be seen from FIG. 5 that the hole 41 has a shoulder 41a and that a coil spring 45 is compressed between shoulder 41a and the head 38a of screw 38.

FIG. 5 also shows that the various diameters of hole 41 are always greater than the diameters of the corresponding portions of screw 38.

Holes 42 and 43 have the same shape as hole 41 described above, and springs similar to spring 45 are compressed between the shoulders of these holes 42, 43 and the corresponding heads of screws 39, 40. These elements have not been shown in detail; only part of these screws 39, 40 is visible in FIG. 2.

The play between the screws 38 to 40 and the wall of holes 41 to 43 in which they are located allows screws 38 to 40 to be screwed in the corresponding threaded holes whatever may be the exact position of laser head 3 in relation to base 2 as a result of the above-described adjustments.

This play is due to the fact that the laser head 3 is not directly connected to the screws 38 to 40 but that springs such as spring 45 are placed between these screws 38 to 40 and the laser head 3 allowing the latter to expand freely in response to its being heated during operation of laser 1.

In the illustrated embodiment, the laser 1 has the further advantage that laser head 3 is in contact with the base 2 only indirectly via the adjustment screws 29 to 31 and the locking screws 38 to 40. As a result, the amount of heat that may flow from the laser head 3 to base 2 during operation of the laser is very small. Heating of the base is also small, and there is no danger of the base 2 being deformed.

In some instances when the laser head 3 dissipates considerable power, an appreciable quantity of radiant heat may be transmitted from head 3 to base 2. To avoid this transmission of heat and deformation of the base which may result, a plate of insulating material can be placed between the laser head 3 and base 2. This non-illustrated arrangement is possible due to the fact that laser head 3 does not rest directly on base 2.

Numerous modifications may be made to the above-described laser without departing from the scope of the invention.

In particular, the orifices situated at the ends of the cooling-fluid duct in laser head 3 can be arranged coaxial to one another, each on one of the end faces of the laser head 3.

In this case, the connectors 19, 20 can be replaced with equivalent pieces fixed to these end faces and each having a single hole passing through it. One end of this hole is situated facing the corresponding orifice and a pipe equivalent to the pipe 21 or 22 of FIGS. 1, 2 and 4 engages in the other end of this hole.

Figure 4:
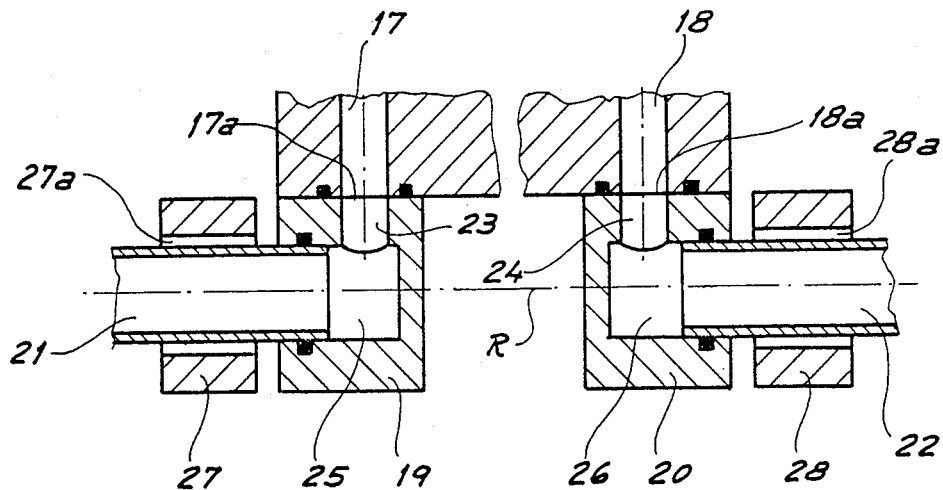
FIG. 4 ia a diagrammatic cross-section of a part of the laser, of FIG. 1 along line B—B of FIG. 3.

The diameter of the above-mentioned orifices may be selected so the ends of these pipes may engage directly in the orifices without any connectors equivalent to connectors 19, 20 of FIGS. 1, 2 and 4.

In such cases, supporting pieces equivalent to pieces 27, 28 may of course also be provided at suitable locations.

In these non-illustrated embodiments of the laser according to the invention, the laser head is also connected to the base by hinges each having a first element made up of pipes for the delivery and removal of cooling fluid, and another element made up by a connector fitted between this pipe and the cooling-fluid duct in the laser head, in some cases, or directly by the end of this duct, in other cases.

As in the embodiment of FIGS. 1 to 4, these hinges enable the laser head to pivot relative to the laser base about an axis parallel to the axis of the laser beam and which, in this instance, passes through the laser head.

The present invention may also be used advantageously even for low power lasers where there is no need to cool the laser head during operation.

In such a case, there is no need to have pipes 21, 22 or their equivalents. But the laser head may nevertheless be connected to the laser base by at least one hinge with its pivoting axis substantially parallel to the laser beam axis. This hinge must of course be made so that its pivoting axis can move parallel to itself during the operations for adjusting the position and the orientation of the laser beam axis as described above.

An embodiment of the laser according to this invention comprising such a hinge has not been shown because providing such a hinge is within the capabilities of persons skilled in the art and there are many ways in which it could be constructed.

We claim:

1. A solid state laser comprising a rigid base, a laser head including a laser rod having a longitudinal axis and a fluid cooled optical pumping amp coupled to said laser rod, and means for connecting said laser head to said base, wherein said connecting means comprises hinge means coupling a cooling fluid to said head and enabling said head to be pivoted as a whole relative to the base about an axis of rotation substantially parallel to said axis of said laser rod.

2. A laser according to claim 1, further comprising means for circulating cooling fluid about said pumping lamp including a pipe for delivering said fluid and a pipe for removing said fluid, both fixed to said base, and at least one duct in said head and connected to said pipes, a portion of said duct passing around said pumping lamp, the end of one of said pipes being cylindrical and forming a first element of said hinge means, the axis of said end of said one pipe coinciding substantially with said axis of rotation.

3. A laser according to claim 2, comprising a connector fixed to said laser head, the connector having a hole communicating with said duct and in which said end of said one pipe is engaged, said connector forming a second element of said hinge means.

4. A laser according to claim 2, wherein one of the ends of said duct leads into one of the lateral surfaces of said laser head via an orifice, and wherein the end of said one pipe is engaged in said end of the duct forming the second element of the hinge means.

5. A laser according to claim 1, further comprising means for adjusting the position and orientation of the axis of said laser rod relative to said base, said adjusting means comprising:
   first, second and third threaded holes each provided in said laser head perpendicular to the plane of said base and arranged in triangular configuration when the laser head is viewed in plan;
   first and second plates arranged in said base facing said first and second threaded holes respectively;
   means for individually moving said first and second plates in a direction substantially perpendicular to the axis of said rod;
   a planar region of said base facing said third threaded hole;
   first, second and third screws threadably engaged in said first, second and third holes respectively and cooperating respectively with said first plate, said second plate and said planar region for separately setting the distances between said laser head and said base at the locations of said screws;
   a conical recess in said second plate and cooperating with the end of said first screw to set the position of the the axis, of said first screw relative to said base; and
   a groove in said second plate in a direction substantially parallel to said axis of said rod and cooperating with the end of said second screw to set the position of the axis of said second screw relative to said base.

6. A laser according to claim 5, comprising means for elastically holding said laser head against said base.

7. A solid state laser comprising:
   a base member;
   a laser head defining a central cavity containing a fluid cooled optical pumping lamp and laser rod, said laser head including a duct for carrying a cooling fluid, said duct having first and second ends terminating in first and second orifices in a surface of said laser head;
   first and second connectors, each having a first blind hole facing a corresponding one of said laser head orifices and forming a fluid connection with said duct, and each having a second blind hole, said second blind holes having a common axis perpendicular to the axis of said first blind hole;
   first and second pipes having ends inserted in each second blind hole of said first and second connectors to form a hinge for coupling said cooling fluid to said laser head and supporting rotation of said laser head as a whole about said common second blind hole axis, said hinge permitting rotation of said head to a service position for removing said optical pumping lamp, said pipes supplying said cooling fluid to and from said laser head during operation of said laser head; and, first and second supporting pieces for supporting said ends of said pipes which are inserted in each second blind hole on said base member.

8. The solid state laser of claim 7 further comprising a plurality of screws having ends protruding through said laser head for contacting said base to position said laser head in an operating position with respect to said base.

9. The solid state laser of claim 8 wherein said plurality of screws include first and second adjustment screws which rest on first and second cooperating plates located in first and second grooves in said base member.

* * * * *

UNITED STATES PATENT AND TRADEMARK OFFICE
CERTIFICATE OF CORRECTION

PATENT NO. : 4,935,938
DATED : June 19, 1990
INVENTOR(S) : Andre Gressly

It is certified that error appears in the above-identified patent and that said Letters Patent is hereby corrected as shown below:

Column 7, line 54, change "amp" to --lamp--.

Column 8, line 36, after "axis" delete the comma.

Signed and Sealed this

Twenty-fifth Day of June, 1991

*Attest:*

HARRY F. MANBECK, JR.

*Attesting Officer*  Commissioner of Patents and Trademarks